(12) United States Patent
Nadeau et al.

(10) Patent No.: US 10,855,684 B2
(45) Date of Patent: Dec. 1, 2020

(54) COMMUNICATION FRAMEWORK FOR A FEDERATION OF NETWORK CONTROLLERS

(71) Applicant: AVAGO TECHNOLOGIES INTERNATIONAL SALES PTE. LIMITED, Singapore (SG)

(72) Inventors: Thomas David Nadeau, Hampton, NH (US); James Gregory Hall, Kittery, ME (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 328 days.

(21) Appl. No.: 15/940,309

(22) Filed: Mar. 29, 2018

(65) Prior Publication Data
US 2018/0219868 A1 Aug. 2, 2018

Related U.S. Application Data

(63) Continuation of application No. PCT/US2017/028399, filed on Apr. 19, 2017.
(Continued)

(51) Int. Cl.
*H04L 29/06* (2006.01)
*G06F 21/00* (2013.01)
(Continued)

(52) U.S. Cl.
CPC .......... *H04L 63/102* (2013.01); *G06F 21/604* (2013.01); *G06N 20/00* (2019.01); *H04L 63/0227* (2013.01); *H04L 63/10* (2013.01)

(58) Field of Classification Search
CPC ... H04L 63/102; H04L 63/10; H04L 63/0227; G06N 20/00; G06F 21/604
See application file for complete search history.

(56) References Cited

U.S. PATENT DOCUMENTS 7,738,898 B2 * 6/2010 Aaron .................... H04M 3/38
455/419
10,452,862 B2 * 10/2019 Wyatt ..................... H04L 63/20
(Continued)

FOREIGN PATENT DOCUMENTS

CN 102907052 A 1/2013
CN 103179046 A 6/2013
(Continued)

OTHER PUBLICATIONS

Open Networking Foundation , "Framework for SDN: Scope and Requirements", Version 1.0, Open Networking Foundation , Jun. 30, 2015, 34 pages, [per International Search Report and Written Opinion retrieved from the Internet <URL: https://www.opennetworking. org/images/stories/downloads/sdn-resources/technical-reports/ Framework_for_SDN_-Scope_and_Requirements.pdf > on Jul. 27, 2017].

(Continued)

*Primary Examiner* — Lisa C Lewis
(74) *Attorney, Agent, or Firm* — Xsensus LLP

(57) ABSTRACT

A communication framework is provided that can be configured to control or limit a network controller's ability to communicate, export, or share the network controller's data with others, such as with other network controllers in the network environment. As part of this framework, techniques are provided that enable constraints to be specified for a particular network controller, where the constraints control and limit the data that is permitted to be communicated from the particular network controller to other network controllers or intended data recipients in the network environment.

19 Claims, 5 Drawing Sheets

Related U.S. Application Data

(60) Provisional application No. 62/325,355, filed on Apr. 20, 2016.

(51) Int. Cl.
    *G06N 20/00*    (2019.01)
    *G06F 21/60*    (2013.01)

(56) References Cited

U.S. PATENT DOCUMENTS

| | | | |
|---|---|---|---|
| 10,540,651 B1* | 1/2020 | Robinson | H04L 29/06585 |
| 2004/0093514 A1* | 5/2004 | Piazza | H04L 63/1416 726/23 |
| 2006/0230431 A1* | 10/2006 | Jemes | H04L 63/102 726/1 |
| 2007/0174381 A1* | 7/2007 | Kitamura | H04L 63/1441 709/200 |
| 2008/0215509 A1* | 9/2008 | Charlton | G06F 21/606 706/11 |
| 2010/0080158 A1* | 4/2010 | Stahl | H04B 1/44 370/311 |
| 2011/0030037 A1* | 2/2011 | Olshansky | H04W 12/08 726/4 |
| 2011/0211575 A1* | 9/2011 | Stille | H04L 63/0227 370/352 |
| 2014/0096183 A1* | 4/2014 | Jain | H04L 12/4633 726/1 |
| 2015/0011226 A1* | 1/2015 | De Sousa | H04W 24/02 455/446 |
| 2015/0163151 A1 | 6/2015 | Li | |
| 2016/0020946 A1 | 1/2016 | Morper | |
| 2016/0081073 A1* | 3/2016 | Lindoff | H04W 72/048 370/329 |
| 2016/0142251 A1* | 5/2016 | Contreras | H04L 45/70 709/220 |
| 2016/0314012 A1 | 10/2016 | Rong et al. | |
| 2017/0142731 A1* | 5/2017 | Gesquiere | H04B 1/3822 |

FOREIGN PATENT DOCUMENTS

| | | |
|---|---|---|
| WO | 2011083780 | 7/2011 |
| WO | 2014/019196 A1 | 2/2014 |
| WO | 2015/067306 A1 | 5/2015 |
| WO | 2017184758 | 10/2017 |

OTHER PUBLICATIONS

PCT/US2017/028399, "International Search Report and Written Opinion", dated Jul. 31, 2017, 9 pages.

R. Enns, et al., "Network Configuration Protocol (NETCONF)" Internet Engineering Task Force (IETF), RFC 6241, Jun. 2011, 113 pages.

P. Shafer, "An Architecture for Network Management Using NETCONF and YANG" Internet Engineering Task Force (IETF), RFC 6244, Jun. 2011, 30 pages.

M. Bjordlund, "YANG—A Data Modeling Language for the Network Configuration Protocol (NETCONF)" Internet Engineering Task Force (IETF), RFC 6020, Oct. 2010, 173 pages.

Brocade Communications Systems, Inc. "Brocade Vyatta Controller User Guide", Supporting Brocade Vyatta Controller v1.1.1, Jan. 12, 2015, 64 pages.

Brocade Communications Systems, Inc. "Brocade SDN Controller Software Installation Guide," Supporting Brocade SDN Controller version 2.3.0, Jan. 25, 2016, 26 pages.

Kevin Phemius et al. "DISCO: Distributed Multi-domain SDN Controllers," Aug. 29, 2013, 8 pages.

Open Networking Foundation, "Software-Defined Networking: The New Norm for Networks", ONF White Paper, Apr. 13, 2012, 12 pages.

Open Networking Foundation, "SDN Architecture Overview", Version 1.0, Dec. 12, 2013, 5 pages.

Open Networking Foundation, "Software-Defined Networking (SDN) Definition", Copyright 2015, 3 pages (retrieved from www.opennetworking.org/sdn-resources/sdn-definition on Sep. 28, 2015).

Thomas D. Nadeau et al., "An Authoritative Review of Network Programmability Technologies—SDN: Software Defined Networks," Copyright O"Reilly Media, Inc., Sebastopol, CA, Copyright 2013, First edition Aug. 2013, 56 pages.

Ken Gray and Thomas D. Nadeau, "Network Function Virtualization," Copyright 2016 Elsevier Inc., Cambridge, MA, pp. iii-ix (title, copyright page, table of contents), and pp. 103-125 (Chapter 5 "The NFV Infrastructure Management").

Open Networking Foundation, "OpenFlow Switch Specification", Version 1.5.0, Dec. 19, 2014, 277 pages.

Supplementary European Search Report dated Mar. 6, 2019, issued in European Application No. 17786572.2.

Chinese Office Action dated Mar. 16, 2020, issued in corresponding Chines Patent Application No. 201780003422.6.

\* cited by examiner

US 10,855,684 B2

COMMUNICATION FRAMEWORK FOR A FEDERATION OF NETWORK CONTROLLERS

CROSS-REFERENCES TO RELATED APPLICATIONS

This application is a (bypass) continuation of International Application No. PCT/US2017/028399, filed Apr. 19, 2017, which claims the benefit and priority from U.S. Provisional Application No. 62/325,355, filed Apr. 20, 2016. The entire contents of the PCT/US2017/028399 and 62/325,355 applications are incorporated herein by reference for all purposes.

BACKGROUND

The present disclosure relates generally to networking technologies, and more particularly to a communication framework for network controllers in a network environment.

A network controller is typically configured to manage one or more network elements within a domain associated with the network controller. Depending upon the size of the network, a domain for a network controller can comprise a large number of network elements (e.g., thousands or tens of thousands) and the size of the data stored by the network controller for the managed network elements can be quite large. This presents several problems related to management of this data and growth of the network. For example, consider a network configuration where a first domain network controller manages a large network corresponding to a first domain and a second domain network controller manages another large network corresponding to a second domain. A network administrator may want to interconnect the two large domain networks to create an even bigger network. This can be done by interconnecting the first and second domain network controllers. This however can have an adverse impact on network performance because of the large unlimited volumes of data related to the individual domain networks that is shared between the two domain network controllers as a result of the interconnection.

BRIEF SUMMARY

The present disclosure relates generally to networking technologies, and more particularly to a communication framework for network controllers in a network environment.

A communication framework is provided that can be configured to control or limit a network controller's ability to communicate, export, or share the network controller's data with others, such as with other network controllers in the network environment. As part of this framework, techniques are provided that enable constraints to be specified for a particular network controller, where the constraints control and limit the data that is permitted to be communicated from the particular network controller to other network controllers, applications, or other intended data recipients in the network environment.

In certain embodiments, a network controller may be provided that comprises a cluster of one or more modules executed by one or more processors. Data for the network controller may be stored in a memory associated with the network controller. Constraints information may be specified for the network controller, the constraints information identifying one or more constraints on communication of data from the network controller to others, such as to other network controllers. In response to a data request, the network controller may determine whether, based upon the constraints information specified for the network controller, communication of data corresponding to the data request is permitted. If not permitted, the network controller disallows or prevents the communication of data corresponding to the data request. If permitted, then the network controller allows the communication of the requested data from the controller.

The constraints information specified for a controller may take various different forms. The constraints information may identify filters, where a filter identifies data that is to be filtered and thus not permitted to be communicated from the controller. In certain embodiments, constraints may be specified in the form of rules (e.g., policy-based rules), lists of restricted data communications (or alternatively, lists of permitted data communications), and the like.

In certain embodiments, systems, methods, and non-transitory computer-readable media storing code or a plurality of instructions executable by one or more processors are provided for performing various operations related to constraining data in a federation of network controllers. For example, in some embodiments, a first network controller may be provided (e.g., executed by one or more computing systems) that is configured to manage a first set of one or more network elements in a first domain, each network element in the first set of network elements configured to provide one or more networking functions. The one or more networking functions provided by the first set of network elements may comprise various functions such as a firewall function, a data forwarding or routing function, and the like. The first network controller may, in response to a data request requesting communication of data from the first network controller to a recipient, determine constraints information specified for the first network controller, the constraints information identifying a set of constraints on communication of data from the first network controller. The first network controller may, based upon the constraints information, determine that communication of the data requested by the data request from the first network controller to the recipient is not permitted, and accordingly, prevent communication of the requested data from the first network controller to the recipient. The recipient may be another network controller, an application, or other entity in the networking environment.

In the embodiment described above, the first set of network elements managed by the first network controller may comprise one or more virtual network elements and/or one or more physical network elements.

In some embodiments, the data request may be received by the first network controller from a second network controller, where the second network controller manages one or more network elements in a second domain, and the recipient is the second network controller. The second network controller is provided by a second system different from the system providing the first network controller, or may be provided by the same computing system as the one providing the first network controller. In some other embodiments, the recipient may be an application that is configured to control or manage one or more network elements. In alternative embodiments, the recipient may be other entities in the networking environment.

In some embodiments, the set of constraints for the first network controller may be based upon various different criteria. For example, the set of constraints may include a first constraint that constrains the communication of data from the first network controller to the recipient based upon a characteristic of a communication channel used for communications between the first network controller and the recipient such as, for example, a type of the communication channel, a communication protocol to be used for communicating the requested data from the first network controller to the recipient, or a state of the communication channel. As another example, the set of constraints may include a constraint that constrains the communication of data from the first network controller to the recipient based upon a characteristic of the first network controller, such as, a location of the first network controller, a characteristic of a network element from the first set of network elements, a state of the first network controller, or a configuration parameter set for the first network controller. As yet another example, the set of constraints may include a first constraint that constrains the communication of data from the first network controller to the recipient based upon a characteristic of the recipient, such as, a location of the recipient, a configuration parameter set for the recipient, a state of the recipient, or, if the recipient is another network controller, a second network controller, a characteristic of a network element controlled by the second network controller.

As yet another example, the set of constraints may include a constraint that constrains the communication of data from the first network controller to the recipient based upon a characteristic of a tenant of the first network controller, a constraint that constrains the communication of data from the first network controller to the recipient based upon a characteristic of the data requested by the data request, or a constraint that constrains the communication of data from the first network controller to the recipient based upon a state of a network environment in which the first network controller and the recipient operate.

In certain embodiments, the constraints information for a network controller may be static and changed manually (i.e., not changeable unless changed by a user) or dynamic (e.g., can be changed by automated techniques without manual intervention). Various different techniques may be used for setting and/or updating the constraints information in an automated, semi-automated, or manual manner. For example, one or more machine-learning or artificial intelligence (AI) techniques may be used to dynamically set or change the constraints criteria automatically or in a semi-automated way.

In certain embodiments, the data for a network controller may be modeled using a modeling language such as YANG. Multiple data models may be specified for a network controller's data. Constraints may then be specified for one or more of the models. A constraint specified for a model may be used to constrain the communication of data corresponding to the model. For example, a first model may be specified for a network controller, the first model identifying a subset of data stored for the network controller. The constraints information for the network controller may comprise information specifying a first constraint associated with the first model. Accordingly, the constraints information may be used as a filtering or constraining filter for controller data exposed by the data models.

In certain embodiments, a network controller may be provided for managing a first set of one or more network elements in a first domain, each network element in the first set of network elements configured to provide one or more networking functions. The network controller may receive a data request requesting communication of particular data from the first network controller to a recipient. As one example, the recipient may be a second network controller managing a second set of one or more network elements in a second domain, each network element in the second set of network elements configured to provide one or more networking functions. Responsive to receiving the data request, the first network controller may determine constraints information specified for the first network controller. The network controller may then determine, based upon the constraints information, whether communication of the particular data from the first network controller to the recipient is permitted. The particular data is communicated from the first network controller to the recipient only upon determining that, based upon the constraints information, communication of the particular data from the first network controller to the recipient is permitted. In this manner, the particular data is not communicated from the first network controller to the recipient if it is determined, based upon the constraints information, that communication of the particular data from the first network controller to the recipient is not permitted.

Various embodiments are claimed directed to a system, a method, and a non-transitory computer-readable medium storing a plurality of instructions executable by one or more processors, wherein any feature mentioned in one claim category, e.g. method, can be claimed in another claim category, e.g., a system, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the claims. The subject-matter which can be claimed comprises not only the combinations of features as set out in the claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the claims.

The foregoing, together with other features and embodiments will become more apparent upon referring to the following specification, claims, and accompanying drawings.

DETAILED DESCRIPTION

Figure 1:
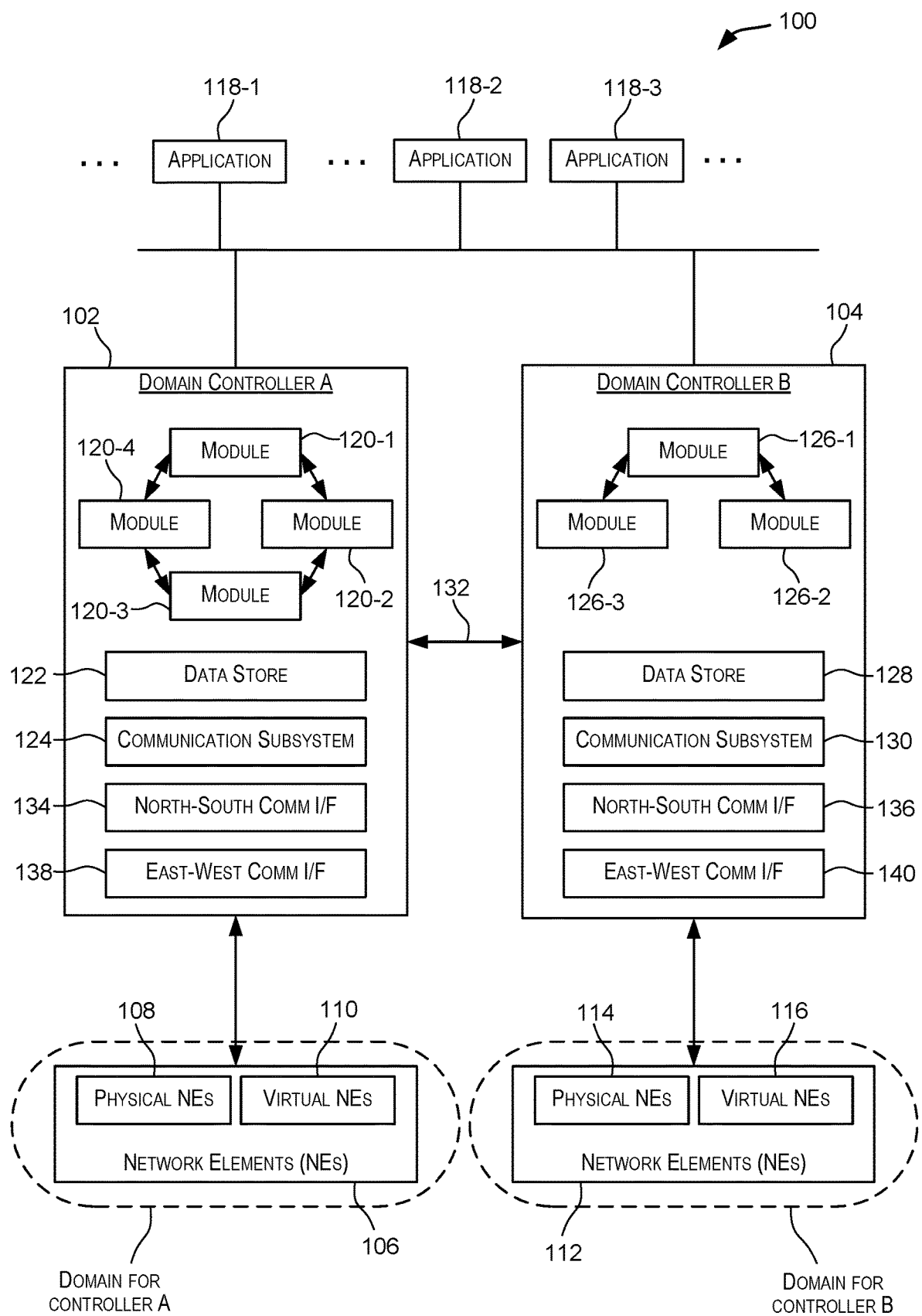
FIG. 1 is a simplified block diagram of a network environment incorporating certain embodiments.

In the following description, for the purposes of explanation, specific details are set forth in order to provide a thorough understanding of claimed embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to networking technologies, and more particularly to a communication framework for network controllers in a network environment. In certain embodiments, a communication framework is provided that can be configured to control or limit a network controller's ability to communicate, export, or share the network controller's data with others, such as with other network controllers in the network environment. As part of this framework, techniques are provided that enable constraints to be specified for a particular network controller, where the constraints control and limit the data that is permitted to be communicated from the particular network controller to other network controllers, applications, or the intended data recipients in the network environment.

A network environment can comprise multiple controllers, each controller configured to manage a number of network elements, including real network elements and virtual network elements. Examples of a virtual network element include without limitation a virtual machine running an application, a container, and the like. A container typically comprises a runtime environment including an application, its dependencies, libraries and other binaries, and configuration files needed to run the application, bundled into one package. For a server running multiple containerized network elements, multiple containers may share the operating system kernel of the server. When network controllers, including software-defined networking (SDN) controllers, are deployed in a network environment, they are arranged together and configured in ways to enable them to manage and interact with the network elements (both real and virtualized) under their management. These arrangements are often based upon administrative control of parts or areas of a network. For example, in certain embodiments, a network may be divided into parts or areas referred to as domains, with each domain including one or more network elements, which may be real and/or virtual network elements. Logically, a domain represents a set of network elements.

Various different criteria or reasons may be used for configuring domains such as, without limitation, regulatory requirements, physical limitations, geographical boundaries, different software systems (e.g., sometimes separation occurs because there are different software systems, i.e., different products), and the like. A single network controller is typically assigned to and responsible for managing network elements within a domain. Such a controller is thus also sometimes referred to as a domain controller or a domain network controller. Typical functions performed by a network controller include but are not limited to discovery of network elements, configuration of network elements, provisioning of network elements, monitoring of network elements, securing network elements, inventory management of network elements, configuration of paths, subnetworks, private networks, tunnels, or other higher 'layered' services provisioned across many network elements, and other functions.

Since a network environment can be partitioned into multiple domains, with each domain being managed by a domain controller, there are typically multiple domain controllers that are deployed within a network environment. When two or more such domain controllers wish to communicate with each other as part of performing a controller function, it is referred to as a federation of controllers. The present disclosure describes a communication framework for controlling communications (e.g., providing the ability to specify constraints on the communications) between such network controllers in a federation.

FIG. 1 is a simplified block diagram of a network environment 100 incorporating certain embodiments. Network environment 100 depicted in FIG. 1 comprises multiple network elements organized into domains, with each domain managed by a network controller. The embodiment depicted in FIG. 1 comprises two network controllers: a domain controller A 102 configured to manage network elements within a domain A, and a domain controller B 104 configured to manage network elements within a domain B. Controllers 102 and 104 may each be configured to act as network controller for multiple network elements (NEs) 106 that are within the domain managed by the controller. The embodiment depicted in FIG. 1 is merely an example and is not intended to be limiting. One of ordinary skill in the art would recognize many variations, alternatives, and modifications. For example, in some embodiments, network environment 100 may have more or fewer elements than shown in FIG. 1, may combine two or more elements, or may have a different configuration or arrangement of elements. For example, while only two controllers 102 and 104 are depicted in FIG. 1, this is not intended to be limiting in any way. A network environment may comprise one, two, or more domains, with each domain being controlled by a network controller. Network elements might belong to one domain and be controlled by one 'master' but it is also possible that multiple network controllers will administer the same network element for different functions. In certain embodiments, applications may be developed to control one network element through two or more network controllers.

The network elements within a domain and managed by a network controller may comprise one or more physical network elements and/or one or more virtual network elements. For example, as depicted in FIG. 1, domain network controller A 102 is configured to manage a domain comprising network elements 106, which may comprise one or more physical network elements 108 and/or one or more virtual network elements 110. In a similar manner, as depicted in FIG. 1, domain network controller B 104 is configured to manage a domain comprising network elements 112, which may comprise one or more physical network elements 114 and/or one or more virtual network elements 116.

Examples of physical network elements include without limitation real physical machines or devices that are configured to provide networking-related functions such as data forwarding, switching, and routing functions. The networking functions provided by a physical network element may also include firewall functionality, and the like. Examples of physical network elements include hardware-based switches, routers, firewall devices, etc. Virtual network elements make use of virtualization technologies to provide networking-related functions. Virtual network elements can include without limitation virtual machines running applications, containerized applications, and the like. Virtual network elements (e.g., virtual network elements 110 and 116) are generally implemented in software and provide networking-related functions via the software implementations. The functions provided by virtual network elements are sometimes referred to as virtual network functions (VNFs) and can include functions related to data forwarding, switching, routing, firewalls, and the like. In certain embodiments, one or more virtual network elements may be implemented on a physical network element. The number of network elements within a domain of a controller can vary from one domain to another and can number from a few network elements to a large number of network elements including tens and thousands of network elements.

As depicted in FIG. 1, one or more applications 118-1, 118-2, 118-3, etc. (application 118 in general) may be communicatively coupled with one or both of controllers 102 and 104. Examples of applications include applications for managing the domain network controllers, for setting or changing network configurations, for performing various functions related to network elements (e.g., monitoring network elements, securing network elements, inventory management of network elements), for configuration and monitoring of higher level network functions such as paths, tunnels, private networks through multiple network elements, and the like.

A network controller, such as network controller 102 or 104, may be implemented using software, hardware, or combinations thereof. In certain embodiments, a controller may be implemented by a process running on a server or a computing system in the network. In some embodiments, the controller process may even be executed by a network element in that network. The network element or server executing the controller may be located within the domain that the controller manages, or may be located in a different domain. It is sometimes typical to run a controller on its own management network to connect it to the network elements, but it is also acceptable to not. Since a network controller communicates with network elements on a network, it is common to segregate a management network which exists solely for the network controller to network element communications and not to carry other traffic, and not to be affected by the configuration of the data network services provided by those network elements. It is also common to use the same network for control and for data service when that is operationally acceptable for a subset of network elements. The connections between a controller and the network elements can be physical or virtualized (e.g., using Virtual Local Area Networks (VLANs) or tunnels) connections.

A network controller may communicate with other network controllers, with network elements within the network controller's domain, and with one or more applications. As depicted in the embodiments in FIG. 1, controllers 102 and 104 may be communicatively coupled to each other via a communication channel 132. Channel 132 may be of different types (e.g., wired, wireless) and may use different communication protocols to facilitate the communications between controller 102 and 104. For example, in certain embodiments, communication channel 132 could use a network tunnel technology to enable the communications, including local access, using protocols such as Generic Routing Encapsulation (GRE), Multiprotocol Label Switching (MPLS), etc.

A network controller may be communicatively coupled with network elements managed by the controller using one or more communication channels. Various different ways and protocols may be used to facilitate communications between a network controller and the network elements managed by that controller. In certain instances, multiple protocols may be used to achieve complete controlling functionality for any specific network element.

In certain embodiments, a network controller is responsible for overall network configuration and management of network elements within the domain controlled by the network controller. For example, network controller A 102 may be responsible for overall network configuration and management of network elements 106. Likewise, network controller B 104 may be responsible for overall network configuration and management of network elements 112. A network controller can be used to set global network-wide policy and its orchestration across multiple network elements, which can be done across multiple network devices, within the network controller's domain. A network controller can be of different types. Examples include SDN controllers, such as SDN controllers provided by Brocade® Communications Systems, Inc. of San Jose Calif., offered as part of the Brocade® SDN Controller (BSC) product, and others. An SDN controller can change and manipulate the state of a network, such as reconfigure a network element such as a router within its domain.

Users, such as network administrators, may use one or more applications 118 to interact with a network controller and the network elements managed by the network controller. A network controller provides a centralized logical view of the network corresponding to the network controller's domain including the network elements, to these applications and users of the applications. An application typically communicates with a network controller rather than with a network element managed by the network controller. For example, an application may request network information from a network controller such as information for the network controller's domain and the network elements within the domain. The information may include, for example, routes information for the network elements, configuration information for the network elements, and the like. As another example, an application may communicate with a network controller to configure a network. For example, a network controller may also receive instructions from an application for managing, changing, and/or manipulating the state of a network formed by network elements included in the network controller's domain. For example, a network controller may receive instructions from an application to set and control network paths between one or more network elements within the network controller's domain. In certain embodiments, one or more applications 118 may be installed on a platform provided by a network controller. For example, in FIG. 1, in some embodiments, application 118-1 may be installed on network controller 102 while application 118-3 may be installed on network controller 104. In some embodiments, network controller 104 may host business logic and data model for an application 118. Alternatively that business logic and data model may also be external to both domain network controllers 102/104. In some other embodiments, an application may be installed on other platforms.

A network controller can comprise a cluster of one or multiple modules. For example, as depicted in FIG. 1, network controller 102 comprises modules 120-1, 120-2, 120-3, and 120-4. Accordingly, from a logical perspective, network controller 102 may be seen as a cluster of modules 120-1, 120-2, 120-3, and 120-4. The modules in a cluster cooperate to form one single logical network controller. For example, the modules 120-1, 120-2, 120-3, and 120-4 all function cooperatively to form one logical network controller 102. Cooperation among a cluster may achieve various degrees of redundancy, high availability, support for in-state software upgrades, scalability, and for other high-performance functionalities. The clustered modules that make up one network controller may be different from the modules that make up another network controller. For example, in FIG. 1, network controller 104 is a cluster of three modules 126-1, 126-2, and 126-3.

A network controller module may be implemented using hardware, software, or combinations thereof. The hardware and/or software that make up a module can be hosted by one or more physical computing systems. Accordingly, the modules cooperating together to form one network controller may run on one computing system or on multiple computing systems. Accordingly, a network controller may be implemented by one computing system, or by multiple computing systems working cooperatively.

In some embodiments, two or more modules of a network controller may be copies or redundancies of each other. This redundancy may be provided to increase performance, scalability, and reliability of the network controller. For example, a network controller may be provided comprising a cluster of two modules, or subsystem-controllers. When one of the subsystem-controllers fails in a network controller, the processing workload and resources may be redirected to the other subsystem-controller module within the cluster such that the network controller continues to perform processing without a break in processing. This redundancy increases the availability of the network controller and minimizes downtime.

Multiple instances of the same network controller may run or execute in parallel on one computing system or may run or execute on multiple computing systems. A network controller instance is configured to be able to determine and connect to the network elements managed by that network controller instance in order to control and manage them. A network controller instance may use different techniques to connect to a network element managed by that network controller. For example, a cloud-based network controller may be provided that reaches into a remote network via a tunnel to connect to network elements managed by the network controller. Network controllers, control network elements, and applications may operate in cloud-based topologies.

A computing system may execute one or more network controllers. For example, a first computing system may execute a first network controller and a second network controller. As described above, a network controller may comprise multiple modules. In certain embodiments, a computing system may execute all the modules of a network controller and thus the network controller is said to be executed by that computing system. In some other embodiments, the execution of modules of a single network controller may be distributed across multiple computing systems. For example, a first computing system may execute one or more modules of a network controller and the other modules of the network controller may be executed by one or more other computing systems. In certain embodiments, a computing system may execute modules of different network controllers, sometimes at the same time. For example, a particular computing system may execute a module for a first network controller and, in parallel, also execute a module for a second network controller. A computing system may thus execute one or more network controllers or one or more modules of one or more network controllers. In some embodiments, a network element itself may be a computing system that executes one or more network controllers, or one or more modules of one or more network controllers.

A first network controller may be considered to be in communication with a second network controller when a module of the first network controller communicates with a module of the second network controller. The two modules that communicate with each other may be on the same computing system or on different computing systems. The first and second network controllers may be different software versions of the same network controller code base (e.g., modules of two instances of the same network controller), or may be completely different ones.

The data for a network controller may be stored in a data store associated with the network controller. This data may represent data used by the network controller for performing its functions and/or data generated by the network controller as a result of performing its functions. The data stored in a network controller's data store may include, for example, network data that is used by the network controller to perform its functions including managing the various network elements within the network controller's domain. For a network controller comprising a cluster of modules, the data store associated with the network controller may be shared by the various modules, which operate cooperatively to form the network controller. For example, in FIG. 1, a data store 122 is associated with network controller 102 and is used for storing data related to network controller 102. Data store 122 may be shared by modules 120-1, 120-2, 120-3, and 120-4 of network controller 102. Likewise, a data store 128 is associated with network controller 104 and is used for storing data for network controller 104. Data store 128 may be shared by modules 126-1, 126-2, and 126-3 of network controller 104. Although data store 122 is shown within network controller 102 (or data store 128 is shown within network controller 104), this represents a logical association and does not require that data store 122 be physically present within the same computing system implementing network controller 102 (or for data store 128 to be physically present within the same computing system implementing network controller 104). The data store for a network controller may be spread across multiple computing systems.

Data stores 122 and 128 may store various types of data associated with their respective network controllers such as network data used by the network controllers to manage the network elements. The data stored in a data store for a network controller may include, for example, data related to network elements within the domain of the network controller, configuration information for the network controller, configuration information for the network elements managed by the network controller, network topology information, routes information, information related to the network controller's domain, and the like. Data stored in a data store may also include application-specific data. For example, an application that provisions paths through multiple open flow capable network elements might introduce a "path" model stored in the network controller and read/write path information to the network controller's data store. As another example, a service model comprising multiple paths might be introduced by an application and stored in the data store as part of the application-specific data. While the embodiment depicted in FIG. 1 shows a single data store being associated with each network controller, this is not intended to be limiting. In alternative embodiments, a network controller may use and be associated with multiple data stores. A data store may be associated with multiple network controllers.

In certain embodiments, communications involving a network controller may be categorized as north-south or east-west communications depending upon the direction of the communications with respect to the network controller.

For example, communications between a network controller and one or more applications 118 and communications between a network controller and the network elements within the network controller's domain may be referred to as north-south communications. In certain embodiments, a network controller may include a communication interface module to facilitate such north-south communications. For example, as shown in FIG. 1, network controller 102 comprises a north-south communication interface module 134 and network controller 104 comprises a north-south communication interface module 136 to facilitate communications in the north-south direction.

In certain embodiments, communications that a network controller has with other network controllers are referred to as east-west communications. A network controller may include a communication interface module to facilitate such east-west communications. For example, in FIG. 1, network controller 102 comprises an east-west communication interface module 138 and network controller 104 comprises an east-west communication interface module 140 to facilitate communications in the east-west direction.

Various different protocols may be used to enable north-south and east-west communications. Examples of some such protocols are given below. However, these examples are not intended to be restrictive. Various other protocols may be used in alternative embodiments for facilitating north-south and east-west communications.

In certain embodiments, a RESTCONF protocol may be used for communications between a network controller and an application. RESTCONF is a type of REST (REpresentational State Transaction) protocol. A REST protocol can be embodied in a number of ways. A network controller may use the RESTCONF protocol in conjunction with Network Configuration Protocol (NETCONF) and use YANG as a modeling language. For example, RESTCONF may provide a programmatic interface over HTTP to access network controller data that is defined in a YANG model and stored in data stores of the network controllers. The YANG model may be used as a schema to declare and define filters according to certain embodiments. Using RESTCONF, operations such as CRUD (create, read, update, or delete) operations can be performed by one or more applications 118 on the data stored in the data stores of the network controllers, such as on the data stored in data store 122 associated with network controller 102 and data store 128 associated with network controller 104. For example, an application may use the RESTCONF interface to install/program network flows (e.g., Layer 2 "L2" flows, Layer 3 "L3" flows), retrieve information regarding network flows, delete installed flows, and perform other operations. In some embodiments, the RESTCONF interface may be facilitated by the north-south communication interface modules within the network controllers. RESTCONF is one example of an application user interface to the network controller's data and operations. Some network controllers, such as those provide by Brocade® Communications Systems, Inc., are pluggable and such interfaces can evolve and revolve over the life cycle of a network controller's architecture.

In certain embodiments, RESTCONF (or some other REST-based protocol) may also be used for east-west communications between the network controllers. For example, network controllers 102 and 104 may use the RESTCONF protocol to communicate and exchange data with each other over communication channel 132.

As indicated above, a network controller may be communicatively coupled to the network elements within its domain via one or more communication channels. A network controller may use different protocols to communicate with the network elements within its domain. For example, network controller 102 may be communicatively coupled with a first network element in network elements 106 via a first communication channel and may use a first protocol to communicate with the first network element. Network controller 102 may be communicatively coupled with a second network element in network elements 106 via a second communication channel and may use a second protocol, which is the same as or different from the first communication protocol, to communicate with the second network element.

In certain embodiments, protocols based upon the OpenFlow® standard may be used for communications between a network controller and the network elements within the network controller's domain. The OpenFlow® standard is managed by the Open Networking Foundation (ONF), a user-led organization dedicated to promotion and adoption of software-defined networking (SDN). A network controller may use OpenFlow®-based protocols to deploy, manage, and update forwarding (e.g., routing and switching) functions across the network elements. The OpenFlow® communication protocol allows an external entity, such as network controller 102 or 104, to access and configure network elements. OpenFlow® can be used to control various aspects of the network, such as traffic forwarding, topology discovery, Quality of Service (QoS), gather information for a network node (e.g., a network switch device) such as node description, flow tables information, ports information, etc., and others. Within a network controller, information retrieved or discovered using the OpenFlow® protocol, such as topological information, may be stored in a data store of the network controller. In some embodiments, the OpenFlow® protocol may be facilitated by north-south communication interface modules of the network controllers.

In certain embodiments, north-south and east-west communications may be based upon the Network Configuration Protocol (NETCONF). NETCONF is a standard that is defined by IETF (latest RFC is RFC 6241). The NETCONF protocol provides mechanisms to install, update, and delete configurations of network devices, such as routers, switches, and firewalls. The protocol uses Extensible Markup Language (XML) based or JavaScript Object Notation (JSON) based data encoding for the configuration data and the protocol messages. A network controller can act both as a NETCONF server and a client. As a client, a network controller can connect to external NETCONF-enabled devices (e.g., network elements) and manage them using NETCONF (southbound interface). A network controller can also act as a NETCONF server and expose itself to other NETCONF-enabled devices so that the network controller can be managed and configured by a NETCONF client, which could be another network controller or a device hosting an application.

As previously indicated, in certain embodiments, a communication framework is provided that can be configured to control or limit a network controller's ability to communicate, export, or share the network controller's data with other network controllers. In certain embodiments, a network controller may include a communication subsystem that implements such a framework. For example, in FIG. 1, network controller 102 comprises a communication subsystem 124 and network controller 104 comprises communication subsystem 130, each communication subsystem configured to control the respective network controller's ability to communicate, export, or share the network controller's data with other network controllers. Communication subsystem 124 is responsible for controlling data that is communicated from network controller 102 to other network controllers. Likewise, communication subsystem 130 is responsible for controlling data that is communicated from network controller 104 to other network controllers.

In certain embodiments, a communication subsystem for a network controller enables constraints (e.g., filters) to be specified for the network controller for constraining or limiting the data that is allowed to be communicated from that network controller to other network controllers, applications, or intended recipients of the data. For example, for network controller 102, communication subsystem 124 enables filters to be specified for network controller 102. Based upon these filters, communication subsystem 124 constrains the data that is communicated from network controller 102 to other network controllers (for example, to network controller 104) or other intended recipients of the data. For network controller 104, communication subsystem 130 enables filters to be specified for network controller 104. Based upon these filters, communication subsystem 130 is configured to constrain the data that is communicated from network controller 104 to other network controllers (for example, to network controller 102) or other intended recipients of the data.

Figure 2:
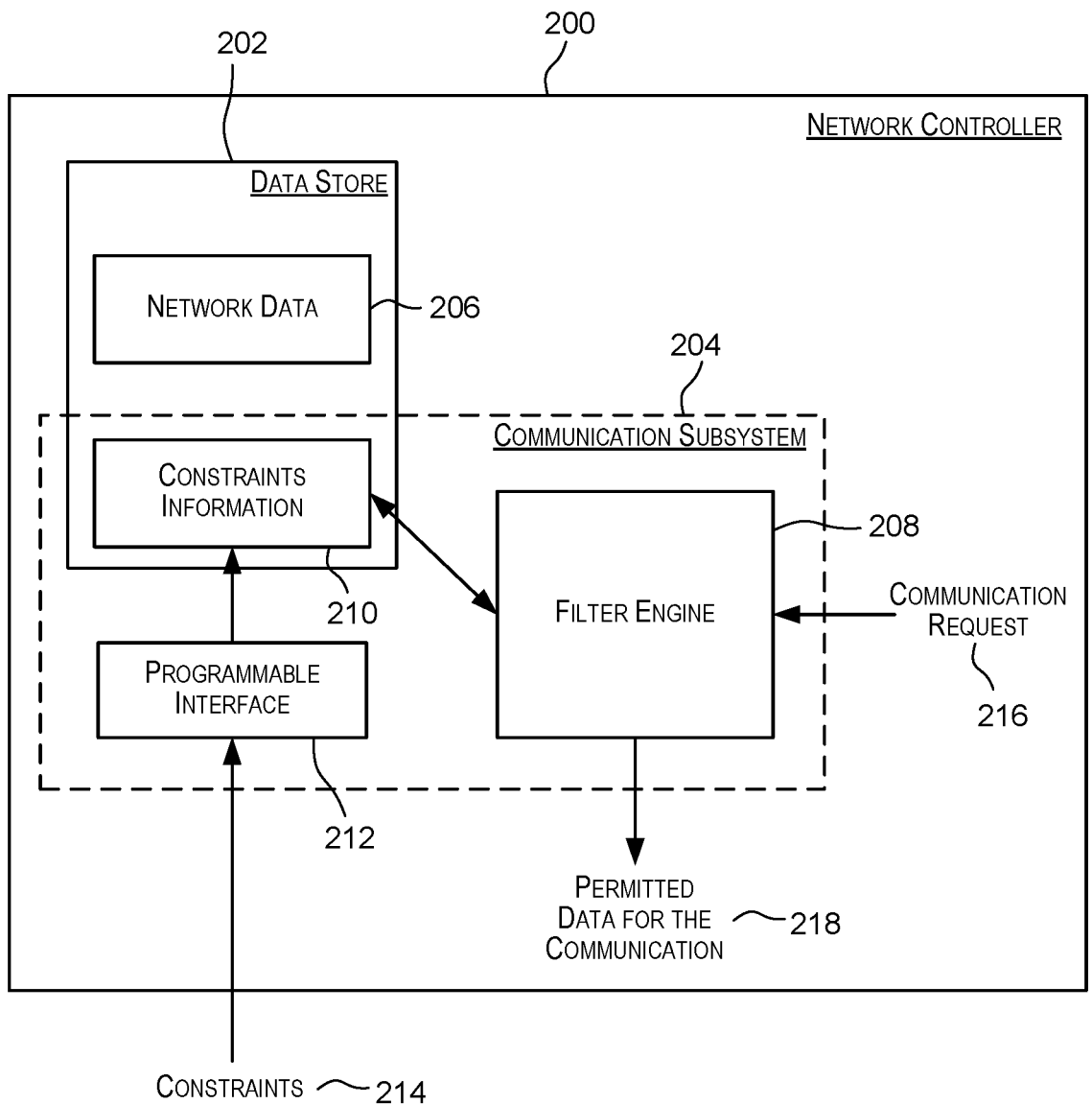
FIG. 2 is a simplified block diagram of a controller showing details of a communication subsystem according to certain embodiments.

FIG. 2 is a simplified block diagram of a network controller 200 showing details of a communication subsystem 204 according to certain embodiments. In the embodiment depicted in FIG. 2, network controller 200 is associated with a data store 202 that stores data for network controller 200. Network controller 200 also includes a communication subsystem 204 for controlling access to network controller 200's data stored in data store 202. Communication subsystem 204 is configured to control data communications from network controller 200 to other network controllers. Communication subsystem 204 is configured enable constraints information 210 to be specified for network controller 200 and to apply the specified constraints to control or limit the data that can be communicated from or shared by network controller 200 to/with others network controllers or other intended data recipients. Communication subsystem 204 uses constraints information 210 to limit network controller 200's data that can be shared with intended data recipients such as other network controllers.

As described above, communication subsystem 204 enables constraints information 210 to be specified for network controller 200. In the embodiment depicted in FIG. 2, communication subsystem 204 comprises a programmable interface subsystem 212 for specifying or programming constraints information 210. The constraints for a network controller may be specified manually (e.g., by a network administrator), using automated techniques (e.g., machine learning techniques), and a combination of manual and automated techniques. In some embodiments, constraints information 210 may be specified manually, for example, by a network administrator. Programmable interface 212 provides an interface that can be used by a network administrator to specify the various constraints for network controller 200. Information indicative of the constraints may be stored as constraints information 210 in data store 202 of network controller 200. For example, a network administrator may, using an application, connect to programmable interface 212 and then specify one or more constraints for network controller 200. Information regarding the specified constraints may be stored in data store 202 as part of constraints information 210.

In some embodiments, the constraints for a network controller may be set or updated automatically. For example, in certain embodiments, unattended learning techniques (e.g., machine-learning techniques) may be used to automatically identify one or more constraints to be used for network controller 200 and also to update the constraints. For example, machine-learning techniques may be used to identify certain conditions (e.g., network conditions related to congestion) and patterns and set and/or update one or more constraints (e.g., limiting the data that can be communicated from the network controller responsive to congestion conditions) responsive to identification of certain patterns of conditions. As another example, network topology-based automation may be provided where the constraints are responsive to changes in network topology. Information identifying the constraints may be stored in data store 200 as part of constraints information 210.

In yet other embodiments, a combination of manual and automated techniques may be used to set constraints information 210. For example, in one embodiment, a user may manually set initial constraints for network controller 200 using programmable interface 212. These initial constraints may then be used as seeds by one or more machine-learning techniques for automatically setting or updating additional constraints. In some embodiments, a user may be allowed to manually change or override the constraints that have been set by an automated technique such as a machine-learning technique.

The constraints defined by constraints information 210 for network controller 200 are then used to limit the data that can be communicated from network controller 200. Such constraining may be performed, for example, in response to a data request received by network controller 200 from another network controller. For example, communication subsystem 204 of network controller 200 may receive or intercept a communication request 216 that requests communication of particular data from network controller 200. The source of the communication request may be another network controller, an application, or other entity. Communication request 216 may, in some instances, be triggered by one or more events that occur in network controller 200, occur in the network, or may be triggered in response to one or more data requests received by network controller 200 from another network controller.

In certain embodiments, responsive to receiving request 216, communication subsystem 204 may be configured to first determine the data that is requested to be communicated from network controller 200 to another network controller. Communication subsystem 204 may then determine, based upon constraints information 210 specified for network controller 200, whether communication of the determined data from network controller 200 is permitted. If communication subsystem 204 determines that communication of that data is not permitted per constraints information 210, then communication subsystem 208 may block or otherwise not allow communication of that data from network controller 200. If instead communication subsystem 204 determines that communication of that data is not restricted by constraints information 210, then that data is allowed to be communicated from network controller 200 to the intended recipient (e.g., the requesting network controller or requesting application) of the data.

In the embodiment depicted in FIG. 2, communication subsystem 204 comprises a filter engine subsystem 208 that is configured to receive or intercept a communication request 216, determine the data that is requested to be communicated from network controller 200 to another network controller by the request, determine, based upon constraints information 210, whether communication of the determined data from network controller 200 is permitted, and then, based upon the determination, either block the communication of that data from network controller 200 or allow the communication of that data from network controller 200.

As described above, the data for a network controller may be stored in a data store for the network controller. For example, as shown in FIG. 2, network data 206 for network controller 200 may be stored in data store 202. In the absence of communication subsystem 204, there are no constraints placed on the data that can be communicated from network controller 200 to intended data recipients such as other network controllers. In other words, in the absence of communication subsystem 204, the entire network data 206 can be communicated from network controller 200 to other network controllers. Communication subsystem 204 is configured to enable constraints to be placed on the data that can be communicated from network controller 200 to an intended data recipient such as another network controller. For example, constraints can be configured that limit the data that can be communicated from network controller 200 to another network controller to a subset (proper subset, i.e., less than all the data stored by network data 206, that could be communicated from network controller 200) of network data 206.

Various different data models may be used to store data for a network controller. For example, in certain embodiments, the data stored for a network controller may be modeled using a modeling language such as YANG. The constraints that are specified for a network controller may then be specified for one or more of the data models. A constraint specified for a model may be used to constrain the communication of data corresponding to the model. For example, a first model may be specified for a network controller, the first model corresponding to a subset of data stored for the network controller. One or more constraints associated with the first model may then be specified for the network controller to put constraints on communication of that subset of data (or a portion thereof) from the network controller. For example, the constraints information for the network controller may comprise information specifying a first constraint associated with the first model. Accordingly, the constraints information may be used as a filter for constraining the network controller's data that is exposed by the data models. For example, two network controllers may query each other using a common protocol such as RESTCONF and discover sets of models supported by each. The intersection of these sets represents a common "language" or set of objects that the network controllers can communicate with each other. Constraints may be specified for a network controller and applied to these sets either a priori per "user", per domain, etc.

In this manner, communication subsystem 204 limits the data that is communicated from or shared by network controller 200 with other network controllers. Limiting the data that can be communicated from a network controller, as opposed to allowing all of the network controller's data to be communicated, enhances the scalability of a federation of network controllers. This in turn enhances the efficiency and scalability of a network environment comprising a federation of such network controllers. For example, consider a network configuration where a first domain network controller manages a large network corresponding to a first domain (i.e., manages a large number of network elements) and a second domain network controller manages another large network corresponding to a second domain. A network administrator may want to interconnect the two large domain networks to create an even bigger network. This can be done by interconnecting the first and second domain network controllers. Without the ability to constrain information communicated from a network controller, before such an interconnection can be made, the network administrator would have to evaluate the adverse impacts on network performance due to such an interconnection because of the unlimited large volumes of data related to the individual domain networks that could then be shared between the two domain network controllers. However, this task is significantly simplified using the constraining mechanism described in this disclosure. By appropriately specifying constraints for the two domain network controllers, the permitted data exchanges between the network controllers can be deterministically configured and controlled. The data communications between the two domain network controllers can be programmatically limited, thereby reducing the adverse impacts on the overall network performance.

Constraints information 210 provides a deterministic, efficient, flexible, and scalable way for programmatically constraining data communications from network controller 200. This programmability of network controllers enables distribution of data between network controllers to be performed in a controlled and configurable manner. The constraining mechanism enables a network controller to share some of its data with other network controllers but also enables the network controller to prevent certain other data from being shared. This enables a network controller to keep certain data private and not share it with other network controllers.

In some embodiments, the communication constraining capability of a network controller may be provided as a user-selectable feature, which can be turned on or off for a network controller according to the user's needs. When turned on, in certain embodiments, two different configurations may be used to constrain the data communications. According to a first configuration, the default mode of operation for network controller 200 may be to allow all data communication unless it is specifically not permitted based upon constraints information 210 specified for the network controller. In such a configuration, the constraints information may identify data communications that are not permitted. According to a second configuration, the default mode of operation for network controller 200 may be to not allow a communication unless it is permitted by constraints information 210 specified for the network controller. In such a configuration, the constraints information for a network controller may identify specific permitted data communications.

Constraints information 210 may take various forms in various embodiments. In certain embodiments, constraints information 210 may be specified as filters, where a filter identifies data that is to be filtered and thus not permitted to be communicated from network controller 200. A filter may be based upon one or more conditions related to a communication, which when satisfied indicate that communication of the data is not permitted. A condition may be based upon one or more criteria related to the communication. In certain embodiments, constraints may be specified in the form of rules (e.g., policy-based rules), lists of restricted data communications (or alternatively, lists of permitted data communications), and the like.

Constraints information 210 may be static (i.e., not changeable unless changed by a user) or dynamic (e.g., can be changed by automated techniques without manual intervention). Various different techniques may be used for setting and/or updating constraints information 210 in an automated, semi-automated, or manual manner. For example, one or more machine-learning or artificial intelligence (AI) techniques may be used to dynamically set or change the constraints criteria automatically or in a semi-automated way. Other techniques such as analytics-based techniques, rules-based techniques (e.g., rules applied to incoming data sets), and others may also be used to dynamically adjust constraints information 210.

In certain embodiments, the filters specified by constraints information 210 are applied to the data stored by a network controller to determine data that is permitted for communication. In a certain non-limiting embodiment, logical relationships between portions of the network controller data may be used to facilitate the filtering. For example, in one embodiment, the data stored by a network controller, such as network controller 200, may be logically organized in a manner that facilitates the identification of portions of the data that can be shared. Various different logical relationships may be used to organize the data. For example, in certain embodiments, the data (or portions thereof) may be logically organized as a hierarchy, for example, as a tree (e.g., an access tree), and constraints may be specified that identify which parts of the data tree are sharable with certain consumers of the data and which are not. For example, data may be organized according to a network services "stack" where high level services may comprise one or more lower layer services comprising yet other lower layered services, and so on. The data for such a services model may be hierarchically organized according to a hierarchy corresponding to their layers. In such embodiments, the inter-controller interactions may be limited, for example, to a specific service layer. For example, constraints may be associated with certain nodes or sections (e.g., subtrees) of the data tree hierarchy corresponding to constraints on data related to those nodes or sections. Typically, the "higher" the node in the tree, the better it is to limit data transfer.

The constraints specified for a network controller may be based upon various different criteria related to the data communications. For purposes of explanation, it is assumed that the intended recipient of the requested data is another network controller. This is not intended to be restrictive. In various examples, the intended recipient could be an application, or other entity in the network environment. For purposes of clarity, the network controller from which data is to be communicated is referred to as the "source" network controller and the network controller to which data is to be communicated is referred to as the "recipient" network controller. Examples of criteria that may be used to put restrictions on the communications include without limitation:

(a) Properties of the source network controller and its domain—e.g., configuration of the source network controller (e.g., based upon a configuration parameter set for the source network controller), domain-related characteristics of the source network controller (e.g., characteristics of one or more network elements within the domain controlled by the source network controller), geographical location of the source network controller (e.g., a network controller in the US may not be allowed to communicate data to a network controller in Europe), state of the source network controller (e.g., congestion experienced by the source network controller at the time of the data request), etc.

(b) Properties of the recipient network controller (or in general, the intended recipient) and its domain—e.g., configuration of the recipient network controller (e.g., based upon a configuration parameter set for the recipient network controller), domain-related characteristics of the recipient network controller (e.g., characteristics of one or more network elements within the domain controlled by the recipient network controller), geographical location of the recipient network controller (e.g., a network controller in the US may not be allowed to communicate data to a network controller in Europe), state of the recipient network controller (e.g., congestion experienced by the recipient network controller at the time of the data request), etc.

(c) Characteristics of the communication channel—e.g., the type of communication channel used for communications between the source and recipient network controllers, communication protocols used for the communication, state of the communication channel at the time of the communication, etc.

(d) Information related to tenants of the source or recipient network controller.

(e) Characteristics of the data that is to be communicated.

(f) Network conditions and state including but not restricted to various sorts of network parameters, telemetric data, statistics, etc.

In certain embodiments, a network controller may support multiple tenants. A tenant may be a closed user group or context. That context may or may not be available and visible to other tenants. A tenant may be a user or group (e.g., a department in a company) which consumes and/or provisions a subset of network resources/services in isolation from other tenant groups. In certain embodiments, a tenant may represent a customer (e.g., a paying customer in a commercial context). A tenant may be provided a certain level of access to the network controller data, which may be the same as or different from the level of access of another different tenant. Constraints may be specified at the tenant-level for a network controller. For example, for the configuration depicted in FIG. 1, network controllers 102 and 104 may both support multiple tenants. The identity of a tenant and other information related to the tenant may be used as criteria for setting constraints for each of the network controllers 102 and 104. For example, in one embodiment, network controller 102 may support multiple tenants including one or more applications of company "ABD". Network controller 104 may also support multiple tenants including one or more applications for another company "XYZ". A tenant may have some ability to provision network services within its scope (e.g., network service provisioning type applications). Company ABD may not want to share any of its data stored by network controller 102 with company XYZ on network controller 104. Accordingly, the constraint information for network controller 102 may be specified such that constraints are imposed on network controller 102 that prevent network controller 102 from sharing any data belonging to ABD with XYZ on network controller 104. In this manner, constraints may be specified along a tenancy criterion to constrain data sharing between network controllers based upon tenancies or tenants supported by the network controllers.

In certain embodiments, the recipients of the data may be organized into groups and constraints may be specified on a group basis. For example, constraint information specified for one or more network controllers may be used to create "groups of entities" such that only the entities within a group can share data with each other and cannot share data with entities outside the group. Accordingly, when such a network controller receives a data request to share data stored by the network controller for a first entity with another entity, that specific data communication is permitted only if the first entity and the another entity are part of the same group.

Figure 3:
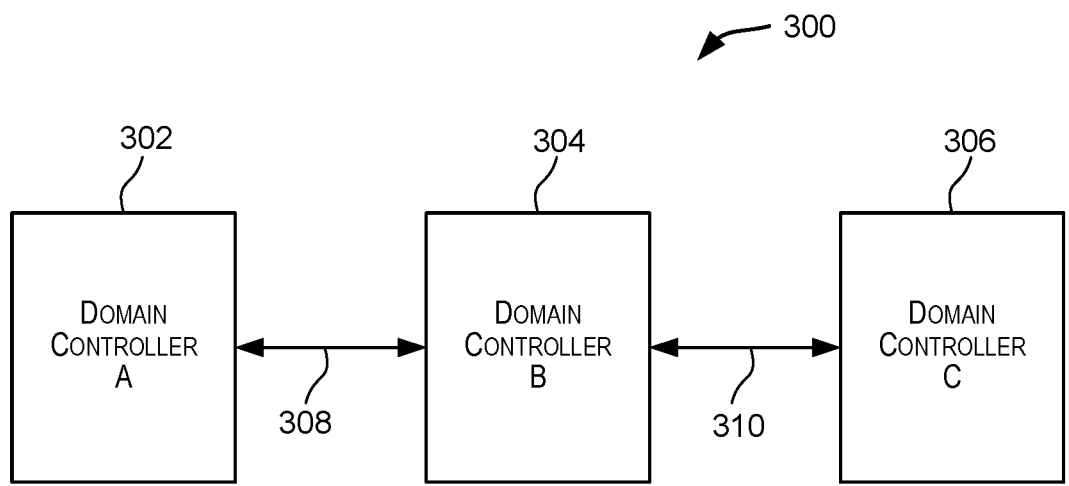
FIG. 3 depicts a network environment in which multiple controllers are configured as peers of each other.

In a network environment, the network controllers themselves may be arranged in various different configurations. FIG. 3 depicts a network environment in which multiple network controllers are configured as peers of each other. The embodiment depicted in FIG. 3 includes three network controllers including a domain network controller A 302, a domain network controller B 304, and a domain network controller C 306 that are all peers of each other. Network controller 302 is communicatively coupled with network controller 304 via communication channel 308 and network controller 304 is communicatively coupled with network controller 306 via communication channel 310. Communication channels 308 and 310 can be of various different types and may use various different communication protocols to enable the communications.

The network controllers in FIG. 3 may belong to one vendor or provider or may belong to different vendors or providers. For example, in one instance, all three network controllers 302, 304, and 306 may be network controllers provided by VendorA, with network controller 302 being configured to manage a west coast domain, network controller 304 being configured to manage a central domain, and network controller 306 being configured to manage an east coast domain. In another embodiment, network controller 302 may be provided by VendorA, network controller 306 may be provided by VendorB, and network controller 304 may be provided by yet another vendor, VendorC.

Using the network controllers configuration depicted in FIG. 3 as an example, in one scenario, constraints may be configured for network controller 302 that allow only a subset (proper subset) of the data stored by network controller 302 to be shared with network controller 304 and with network controller 306. For example, if only a set of "edge ports" of a network on 302 were seen by 304, then it could use 302 to provision paths through the 302 network without being exposed to the device hop details of the path. This achieves the efficiencies and division of responsibilities desired of a federation of controllers. Constraints may be configured for network controller 306 that allow only a subset (proper subset) of the data stored by network controller 306 to be shared with network controller 304. Constraints may be set for network controller 304 that do not allow network controller 304 to share any data received by network controller 304 from network controller 302 with network controller 306. Constraints may also be set for network controller 304 that do not allow network controller 304 to share any data received by network controller 304 from network controller 306 with network controller 302. In this manner, even though network controller 304 may receive a subset of data from network controller 302 and from network controller 304, network controller 304 is programmatically not allowed to share data received by network controller 304 from network controller 302 with network controller 306 and is not allowed to share data received by network controller 304 from network controller 306 with network controller 302.

Figure 4:
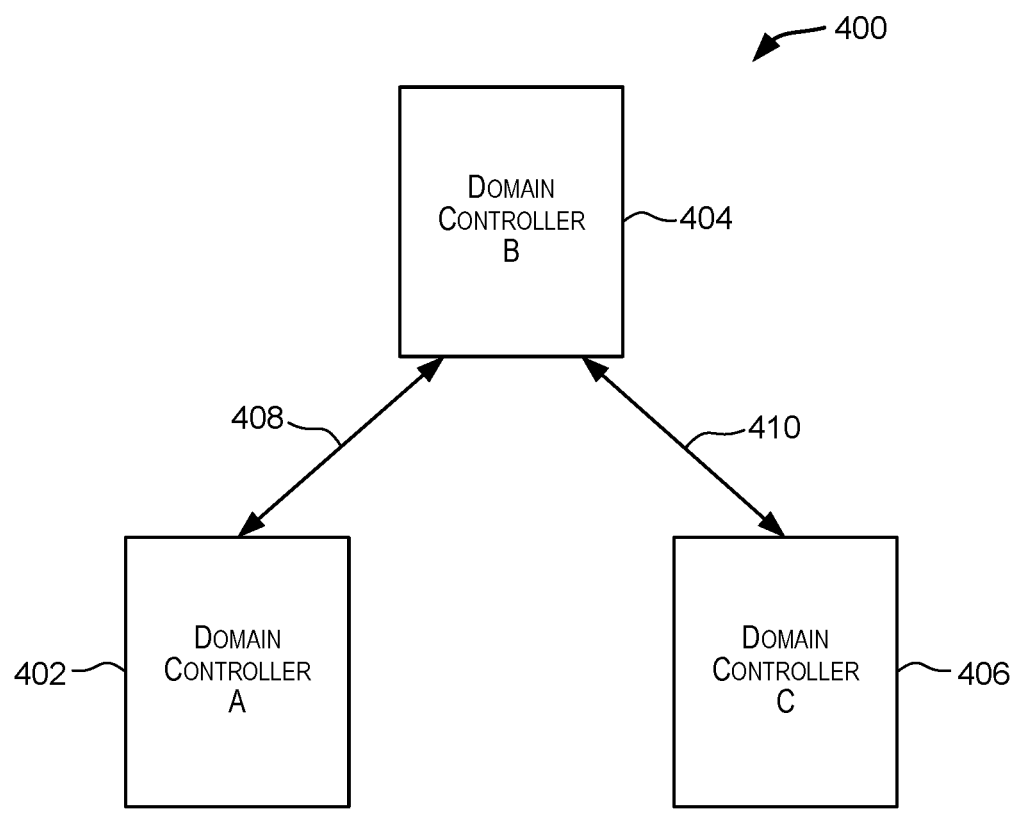
FIG. 4 depicts a network environment in which multiple controllers are configured according to a hierarchy.

FIG. 4 depicts a network environment in which multiple network controllers are configured according to a hierarchy. The embodiment depicted in FIG. 4 includes three network controllers, namely, domain network controller A 402, domain network controller B 404, and domain network controller C 406, configured according to a hierarchy. In such a configuration, network controller B 404 may be referred to as the main domain network controller with network controllers A 402 and C 406 referred to as subdomain network controllers. Subdomain network controller A 402 is communicatively coupled with main network controller B 404 via communication channel 408 and main network controller B 404 is communicatively coupled with subdomain network controller C 406 via communication channel 410. Communication channels 408 and 410 can be of various different types and may use various different communication protocols to enable the communications.

The network controllers in FIG. 4 may belong to one vendor or provider or may belong to different vendors or providers. For example, in one instance, all three network controllers 402, 404, and 406 may be provided by VendorA. In such a scenario, subdomain network controller A 402 may be configured for managing a west coast domain, subdomain network controller C 406 may be configured for managing an east coast domain, and main domain network controller B 404 may be configured to manage the entire US spanning both the east coast and the west coast. In another embodiment, subdomain network controller A 402 may be provided by a VendorA, subdomain network controller C 406 may be provided by VendorB, and main network controller B 404 may be from a third inter-provider vendor.

Figure 5:
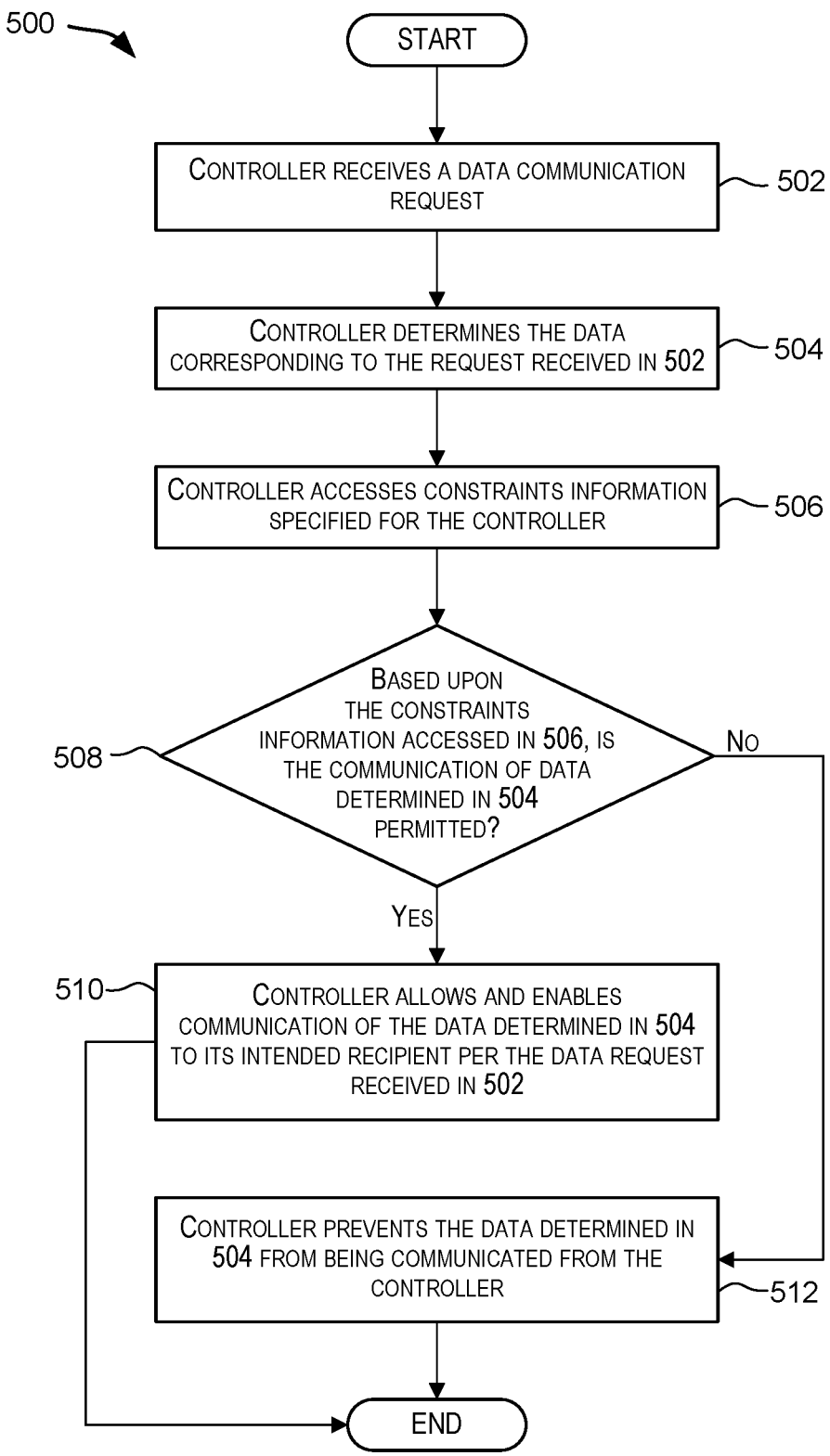
FIG. 5 depicts a simplified flowchart showing processing performed by a controller for communicating data from the controller to another controller according to certain embodiments.

FIG. 5 depicts a simplified flowchart 500 showing processing performed by a network controller for communicating data from the network controller to another network controller according to certain embodiments. The particular series of processing steps depicted in FIG. 5 is not intended to be limiting. It is appreciated that the processing steps may be performed in an order different from that depicted in FIG. 5, and that not all the steps depicted in FIG. 5 need be performed. In one embodiment, the processing depicted in FIG. 5 may be performed by a communication subsystem of a network controller such as communication subsystem 204 depicted in FIG. 2. The processing may be performed by a computer system that executes the network controller.

At 502, a network controller receives a data communication request requesting data to be communicated from the network controller to another network controller. The data request may originate on the network controller itself due to some event, or may be received by the network controller from another network controller, or from some other entity such as an application.

At 504, the network controller determines the data to be communicated corresponding to the request received in 502. The data determined in 504 may be selected from and may be part of the data stored in a data store of the network controller.

At 506, the network controller accesses constraints information specified for the network controller. The constraints information may be stored on a data store associated with the network controller. The constraints information for a network controller may specify a set of one or more constraints. The constraints may be based upon various different criteria such as characteristics of the source network controller, characteristics of the recipient of the data to be communicated, characteristics of the communication channel to be used for the communication, characteristics of the data that is to be communicated, conditions of the network environment in which the source network controller and the recipient operate, and the like. In certain embodiments, a constraint may identify a condition, which if satisfied, determines whether the data communication is permitted or not from the source network controller. In certain embodiments, constraints may be specified in the form of rules (e.g., policy-based rules), lists of restricted data communications (or alternatively, lists of permitted data communications), and the like.

At 508, based upon the constraints information accessed in 506, the network controller determines whether communication of the data determined in 504 is permitted. If it is determined in 508 that the communication of the data determined in 504 is permitted, then in 510, the network controller allows and enables the communication of the data determined in 504 to its intended recipient per the data request received in 502, and processing then ends. Else, if it is determined in 508 that the communication of the data is not permitted, then in 512, the network controller prevents the communication of the data from the network controller. In this manner, the communication of the requested data from the network controller is either permitted or not permitted based upon constraints information specified for the network controller.

With the advent and proliferation of cloud computing, network architectures are being modeled to suit the cloud's needs. In certain embodiments, the deep and massive stack of modern cloud infrastructure is logically modeled in a common network controller framework. Geographical distribution of the lower layers closest to the physical infrastructure may be achieved by deploying network controller clusters in datacenters. Massive datacenters may deploy multiple network controller clusters following some natural service boundaries. Higher layer services may be provided that span the domains of lower layer network controller clusters and are modeled in higher layer network controller clusters which collect data from network controllers modeling lower layers. Consumers of any particular modeling layer can interact with the network controller cluster providing that layer, without adding any direct load to the rest of the system. The upper layer network controllers may query the network controllers of lower layers to discover the lower layer models, and represent relationships between the layers. For example, a Wide Area Network (WAN) service between a New York (NY) datacenter and a San Jose (SJ) datacenter can be modeled in a network controller layered above the NY and SJ network controllers. For example, referring back to FIG. 4, network controller 402 may be configured to be the SJ network controller, network controller 408 may be configured to be the NY network controller, and network controller 406 may be configured to manage WAN service between NY and SJ. The relevant network resources in the NY and SJ network controller models (e.g., models modeled using YANG) will be related to the WAN service model in the higher network controller.

In certain embodiments, mechanisms are provided for discovering lower layer models, creating and maintaining inter-layer relationships, and providing the reliable triggering of business logic in the higher layers upon changes in the lower layer when these layers run in separate network controller clusters.

In certain embodiments, data models (e.g., in YANG) may be used to generate the north-bound interface (e.g., REST-CONF), which completely describe every element, its syntax and semantics, that are exposed to federated network controller peers. The communication subsystem described above can be used to constrain the exposure of sharing of these data models. The RESTCONF can act as and may be programmed as a filtering or constraining point for the aforementioned data exposed by the data models. The constraints may be based upon without limitation, policy, security, access controls such as multi-tenant access, resource limitations, etc. These filters specified in the constraints information can be completely described using other data models (e.g., YANG). The model describes a (proper) subset of the data held and managed by the network controller that is also available through the same access mechanisms such as RESTCONF. For example, a totality of the models may be used to describe the data in the data store for a network controller. The data are instances of that data model. So, for a variable described in a model (e.g., received packets or PktsIn), there can be an instance of that variable per tenant/user. There is thus a subset of the model available to each user (or not), and the proper subset contains them all. Filters/constraints are used to limit access to certain parts of this complete set. For example, two network controllers may query each other using a common protocol such as REST-CONF and discover sets of models supported by each. The intersection of these sets represents a common "language" or set of objects that the network controllers can communicate with each other. Constraints may be specified for the network controller and applied to these sets either a priori per "user", per domain, etc.

As previously indicated, a network controller may be implemented in hardware, software, or combinations thereof. When implemented in software, a network controller may be implemented by code or instructions that are executable by one or more processors. The code or instructions may be stored on a non-transitory computer readable medium or memory and may be executed by one or more processors of one or more computing systems. A computing system may execute one or more network controllers by executing the code or instructions implementing the network controllers. As previously indicated, a network controller can comprise one or more modules that may be implemented in software, hardware, or combinations thereof. A computing system may execute one or more of these modules of a network controller. A network controller is considered to be executed by one or more computing systems that execute one or more modules of the network controller.

Figure 6:
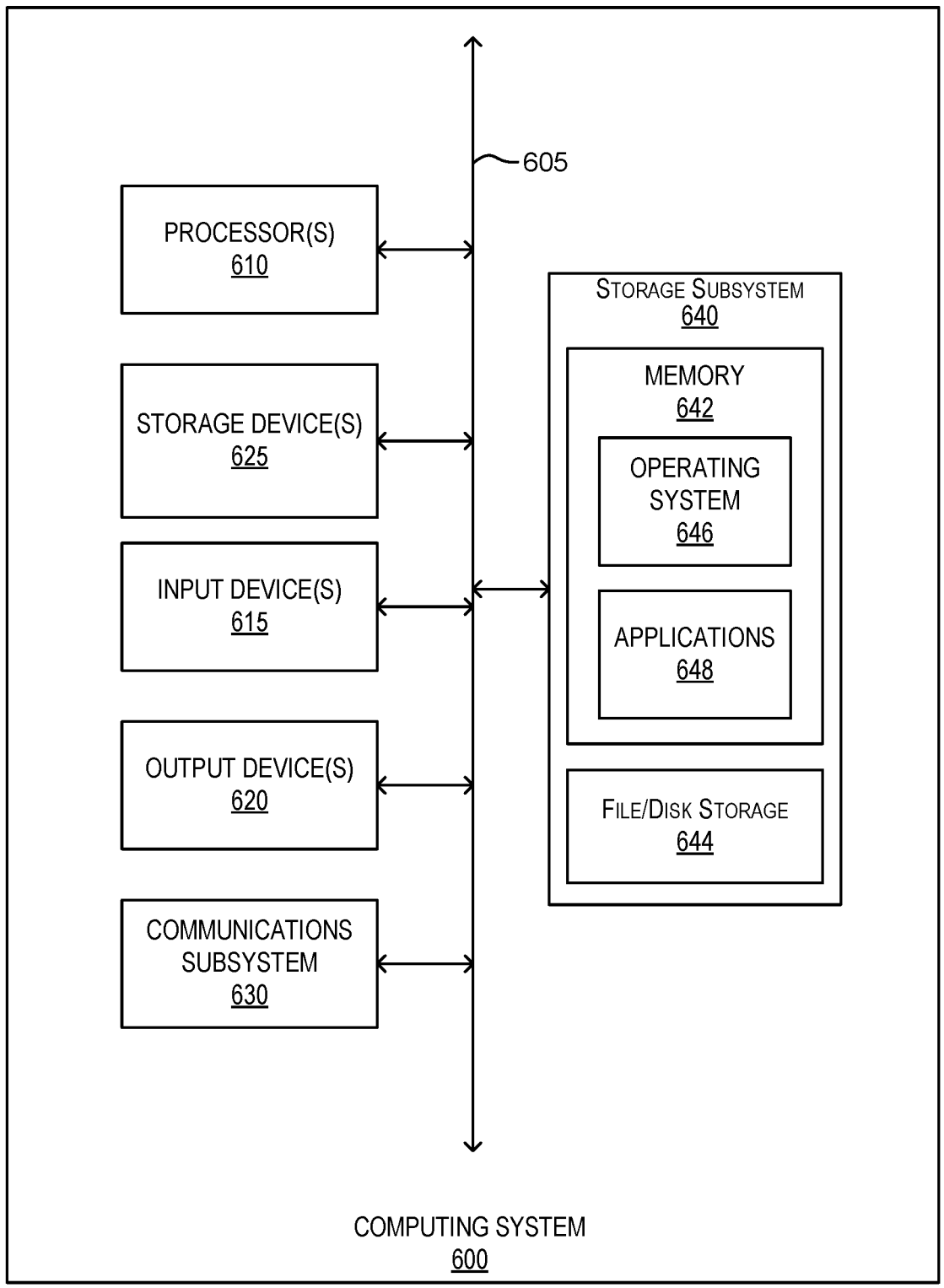
FIG. 6 is a simplified block diagram of a computing system or device that may be used to execute various modules of a controller according to certain embodiments.

FIG. 6 is a simplified block diagram of a physical computing system or device 600 that may be used to implement a network controller according to certain embodiments. For example, computing system 600 may be used to execute the one or more modules (e.g., modules 120-1, 120-2, 120-3, and 120-4 depicted in FIG. 1 for network controller 102) implementing a network controller. In some embodiments, computing system 600 is configured to implement any of the methods described above. For example, one or more computing systems like computing system 600 may be used to execute code or instructions implementing one or more network controllers. A computing system may also execute one or more applications that interface with the network controllers. A computing system may also host one or more network elements.

Computing system 600 can be of various types including, without limitation, a personal computer, a portable computer, a workstation, a network computer, a mainframe, a kiosk, a mobile device such as a PDA or cell phone, a physical network device (e.g., a router, switch), or any other data processing system. Due to the ever-changing nature of computers and networks, the description of computing system 600 depicted in FIG. 6 is intended only as a specific example for purposes of illustrating the preferred embodiment of the computing system. Many other configurations having more or fewer components than the system depicted in FIG. 6 are possible.

As shown in FIG. 6, computing system 600 may comprise several components that can be communicatively coupled via a bus 605. The components may include one or more processors 610, one or more input devices 615, one or more output devices 620, a communications subsystem 630, storage devices 625, and a storage subsystem 640. Bus subsystem 605 provides a mechanism for letting the various components and subsystems of computing system 600 communicate with each other as intended. Although bus subsystem 605 is shown schematically as a single bus, alternative embodiments of the bus subsystem may utilize multiple busses.

Processors 610 represent the processing resources of computing system 600 and may include without limitation one or more general-purpose processors and/or one or more special-purpose processors (such as digital signal processing chips, graphics acceleration processors, and/or the like). Processors 610 may include one or more single or multicore processors.

Input devices 615 may include one or more different mechanisms for providing inputs to computing system 600 such as, without limitation, a mouse, a keyboard, a touchpad, a tablet, and/or the like. Output devices 620 may include one or more different mechanisms for outputting information from computing system 600 such as, without limitation, a display unit, audio output devices, a printer, and/or the like.

Computing system 600 may also include a communications subsystem 630, which facilitates communications to and from computing system 600. Communications subsystem 630 can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like that facilitates communication of data. Communications subsystem 630 enables computing system 600 to receive and/or transmit data to one or more other computing systems, one or more networks, and/or any other devices.

Storage subsystem 640 provides a non-transitory medium for storing data and code (instructions) that can be executed by one or more processors 610 for performing the various methods and processing described in this disclosure. For example, storage subsystem 640 may be configured to store the basic programming and data constructs that provide the functionality of certain embodiments. According to certain embodiments, software code instructions or modules implementing the functions described in this disclosure may be stored in storage subsystem 640. These software modules may be executed by one or more processor(s) 610. Storage subsystem 640 may also provide a repository for storing data used in accordance with certain embodiments. For example, in a computer system implementing a network controller, storage subsystem 640 may provide a repository for storing constraints information specified for the network controller and may also act as a data store for storing the network controller's data.

In certain embodiments, storage subsystem 640 may comprise a memory subsystem 642 and a file/disk storage subsystem 644. Memory subsystem 642, sometimes also referred to as system memory, may include a number of memories such as a main random access memory (RAM) for storage of instructions and data during program execution, a read only memory (ROM) in which fixed instructions are stored, flash memory, and the like. Various software elements may be located within system memory 642 such as an operating system 646, device drivers, executable libraries, and/or other code, such as one or more application programs 648, which may comprise computer programs provided by various embodiments, and/or may be designed to implement methods, and/or configure systems, provided by other embodiments, as described herein.

File storage subsystem 644 provides persistent (non-volatile) storage for program and data files, and may include a hard disk drive, a floppy disk drive along with associated removable media, a Compact Disk Read Only Memory (CD-ROM) drive, an optical drive, removable media cartridges, local and/or network accessible storage, and other like storage media and devices. As shown in FIG. 6, computing system 600 may also include one or more storage devices 625 that are part of computing system 600 or are accessible by computing system 600. Data for a network controller, such as network data 206, may be stored by file storage subsystem 644, by storage devices 625, or by some other storage accessible by the network controller.

The terms "machine-readable medium" and "computer-readable medium," as used herein, refer to any non-transitory medium that stores data and/or instructions (e.g., code, program) that cause one or more computing systems, machines, or processors to operate in a specific fashion and perform certain functions. In an embodiment implemented using computing system 600, various computer-readable media might be involved in storing instructions/code that are/is executable by one or more processor(s) 610. A computer-readable medium may be embodied in various forms such as non-volatile memory or volatile memory.

The methods, systems, and devices discussed above are examples and are not intended to be limiting. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner. Technology evolves and, thus, many of the elements are examples that do not limit the scope of the disclosure to those specific examples.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the claimed embodiments. Rather, the preceding description of the embodiments will provide those skilled in the art with an enabling description for implementing claimed embodiments. Various changes may be made in the function and arrangement of elements without departing from the spirit and scope of the disclosure.

Although specific embodiments have been described, various modifications, alterations, alternative constructions, and equivalents are also encompassed within the scope of claimed embodiments. Embodiments are not restricted to operation within certain specific data processing environments, but are free to operate within a plurality of data processing environments. Additionally, although certain embodiments have been described using a particular series of transactions and steps, it should be apparent to those skilled in the art that the scope of the claimed embodiments is not limited to the described series of transactions and steps. Although some flowcharts describe operations as a sequential process, many of the operations can be performed in parallel or concurrently. In addition, the order of the operations may be rearranged. A process may have additional steps not included in the figure.

Further, while certain embodiments have been described using a particular combination of hardware and software, it should be recognized that other combinations of hardware and software are also within the scope of this disclosure. Certain embodiments may be implemented only in hardware, or only in software (e.g., code programs, firmware, middleware, microcode, etc.), or using combinations thereof. The various processes described herein can be implemented on the same processor or different processors in any combination. Where components, modules, systems, or devices are described as being configured to perform certain operations or functions, such configuration can be accomplished, e.g., by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof, and the like. Processes can communicate using a variety of techniques including but not limited to conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A system comprising:
    one or more processors; and
    a memory coupled with the one or more processors, the memory configured to store instructions that when executed by the one or more processors cause the one or more processors to:
        serve as a first network controller configured to:
            manage a first set of one or more network elements in a first domain, each network element in the first set of network elements configured to provide one or more networking functions;
            receive a data request from a second network controller configured to manage one or more network elements in a second domain;
            determine in response to the data request requesting communication of particular data from the first network controller to the second network controller, constraints information specified for the first network controller, the constraints information identifying a set of constraints on communication of data from the first network controller including information regarding a limit on a volume of data to be shared;
            determine based upon the constraints information, that communication of the particular data from the first network controller to the second network controller is not permitted on condition that the particular data exceeds the limit on the volume of data; and
            prevent communication of the particular data from the first network controller to the second network controller.

2. The system of claim 1, wherein the first set of network elements managed by the first network controller comprises a virtual network element.

3. The system of claim 1, wherein the first set of network elements managed by the first network controller comprises a physical network element.

4. The system of claim 1, wherein the second network controller is in by a second system different from the system including the first network controller.

5. The system of claim 1, wherein the one or more networking functions provided by the first set of network elements comprise at least one of a firewall function or a data forwarding function.

6. The system of claim 1, wherein the set of constraints includes a constraint based upon a characteristic of a communication channel used for communications between the first network controller and the second network controller.

7. The system of claim 6, wherein the characteristic of the communication channel is a type of the communication channel, a communication protocol to be used for communicating the particular data from the first network controller to the second network controller, or a state of the communication channel.

8. The system of claim 1, wherein the set of constraints includes a constraint based upon a characteristic of the first network controller.

9. The system of claim 8, wherein the characteristic of the first network controller is a location of the first network controller, a characteristic of a network element from the first set of network elements, a state of the first network controller, or a configuration parameter set for the first network controller.

10. The system of claim 1, wherein the set of constraints includes a constraint based upon a characteristic of the second network controller.

11. The system of claim 10, wherein:
    the characteristic of the second network controller is a location of the second network controller, a characteristic of a network element controlled by the second network controller, a state of the second network controller, or a configuration parameter set for the second network controller.

12. The system of claim 1, wherein the set of constraints includes a constraint based upon a characteristic of a tenant of the first network controller.

13. The system of claim 1, wherein the set of constraints includes a constraint based upon a characteristic of the particular data requested by the data request.

14. The system of claim 1, wherein the set of constraints includes a constraint based upon a state of a network environment in which the first network controller and the second network controller operate.

15. The system of claim 1, wherein the set of constraints comprises a constraint that is set automatically using an automated learning technique.

16. The system of claim 1, wherein:
    a first data model is specified for the first network controller, the first data model identifying a subset of data stored for the first network controller; and
    the constraints information comprises information specifying a constraint associated with the first model.

17. The system of claim 1, wherein the constraints information is updated using an automated learning technique.

18. A method of operating a first network controller, the method comprising:

managing a first set of one or more network elements in a first domain, each network element in the first set of network elements configured to provide one or more networking functions;

receiving a data request from a second network controller configured to manage one or more network elements in a second domain requesting communication of particular data from the first network controller;

determining in response to the data request, constraints information specified for the first network controller including information regarding a limit on a volume of data to be shared;

determining based upon the constraints information, whether communication of the particular data from the first network controller to the second network controller is permitted; and communicating the particular data to the second network controller only upon determining that, based upon the constraints information including that the particular data does not exceed the limit on the volume of data, communication of the particular data from the first network controller to the second network controller is permitted.

19. A non-transitory computer-readable medium storing instructions executable by one or more processors, the instructions when executed by the one or more processors causing the one or more processors to perform operations of operating a first network controller including:

managing a first set of one or more network elements in a first domain, each network element in the first set of network elements configured to provide one or more networking functions;

receiving a data request from a second network controller configured to manage one or more network elements in a second domain requesting communication of particular data from the first network controller;

determining in response to the data request, constraints information specified for the first network controller including information regarding a limit on a volume of data to be shared;

determining based upon the constraints information, whether communication of the particular data from the first network controller to the second network controller is permitted; and communicating the particular data to the second network controller only upon determining that, based upon the constraints information including that the particular data does not exceed the limit on the volume of data, communication of the particular data from the first network controller to the second network controller is permitted.

\* \* \* \* \*